US012797983B2

(12) United States Patent
Dorriety et al.

(10) Patent No.: US 12,797,983 B2
(45) Date of Patent: Nov. 17, 2026

(54) BRAZE REPAIR

(71) Applicants: Daniel James Dorriety, Greenville, SC (US); Piotr Artur Klimczuk, Warsaw (PL); Jeremy Eric Gard, Greenville, SC (US); Jacob Andrew Salm, Greenville, SC (US); Frederic Woodrow Roberts, Jr., Greenville, SC (US); GENERAL ELECTRIC TECHNOLOGY GMBH, Baden (CH)

(72) Inventors: Daniel James Dorriety, Greenville, SC (US); Piotr Artur Klimczuk, Warsaw (PL); Jeremy Eric Gard, Greenville, SC (US); Jacob Andrew Salm, Greenville, SC (US); Frederic Woodrow Roberts, Jr., Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/720,290

(22) PCT Filed: Dec. 21, 2021

(86) PCT No.: PCT/PL2021/050091

§ 371 (c)(1),
(2) Date: Jun. 14, 2024

(87) PCT Pub. No.: WO2023/121488

PCT Pub. Date: Jun. 29, 2023

(65) Prior Publication Data

US 2025/0018488 A1 Jan. 16, 2025

(51) Int. Cl.
*B23K 1/00* (2006.01)
*B23K 35/02* (2006.01)

(52) U.S. Cl.
CPC ........ *B23K 1/0018* (2013.01); *B23K 35/0244* (2013.01)

(58) Field of Classification Search
None
See application file for complete search history.

(56) References Cited

U.S. PATENT DOCUMENTS 5,511,721 A * 4/1996 Demo .................... B23K 31/02 228/119
5,666,643 A * 9/1997 Chesnes .................. B23P 6/002 228/262.9

(Continued)

FOREIGN PATENT DOCUMENTS

EP 1 759 799 A2 3/2007
EP 3441180 A1 * 2/2019 .............. B23P 6/007

(Continued)

OTHER PUBLICATIONS

International Preliminary Report on Patentability in PCT/PL2021/050091, mailed Jun. 20, 2024, 9 pages.

(Continued)

*Primary Examiner* — Devang R Patel
(74) *Attorney, Agent, or Firm* — James Pemrick; Charlotte Wilson; Hoffman Warnick LLC

(57) ABSTRACT

A method comprising the steps of positioning a constraining member on a component to create a zone between the component and the constraining member. A first material composition is positioned in the zone between the component and the constraining member, and a second material composition is positioned in the zone between the component and the constraining member. The second material composition is positioned on the first material composition. Heat treating the component, the constraining member, the first material composition, and the second material composition occurs. The second material composition flows into (Continued)

the first material composition and forms a third material composition. The constraining member is removed from the component and the third material composition.

19 Claims, 3 Drawing Sheets

(56) References Cited

U.S. PATENT DOCUMENTS

| | | | | |
|---|---|---|---|---|
| 5,806,751 | A * | 9/1998 | Schaefer | B23K 20/233 228/119 |
| 5,935,718 | A * | 8/1999 | Demo | B23P 6/002 428/577 |
| 6,214,248 | B1 | 4/2001 | Browning et al. | |
| 6,503,349 | B2 * | 1/2003 | Pietruska | F01D 5/005 228/119 |
| 6,615,470 | B2 * | 9/2003 | Corderman | B23P 6/007 29/402.13 |
| 6,726,086 | B2 * | 4/2004 | Philip | C22F 1/10 228/111.5 |
| 6,884,964 | B2 * | 4/2005 | Murphy | B23P 6/005 228/119 |
| 7,416,108 | B2 * | 8/2008 | Philip | B23P 6/002 228/248.1 |
| 7,533,795 | B2 * | 5/2009 | Schaeffer | B23K 31/02 228/119 |
| 7,699,944 | B2 * | 4/2010 | Hu | B23K 1/0018 148/428 |
| 8,555,500 | B2 * | 10/2013 | Vossberg | B23P 6/007 29/888.011 |
| 9,056,443 | B2 * | 6/2015 | Schick | B23K 1/0018 |
| 9,162,328 | B2 * | 10/2015 | Ogasahara | B23K 35/025 |
| 10,076,811 | B2 * | 9/2018 | Ozbaysal | B23K 35/0244 |
| 10,625,361 | B2 * | 4/2020 | Eminoglu | B23K 26/144 |
| 2006/0248718 | A1 * | 11/2006 | Szela | B23K 1/0018 29/402.13 |
| 2007/0044306 | A1 * | 3/2007 | Szela | B23K 9/04 29/889.1 |
| 2008/0265005 | A1 * | 10/2008 | Minor | B23K 1/20 228/124.1 |
| 2015/0041522 | A1 * | 2/2015 | Ogasahara | B23K 35/025 228/119 |
| 2018/0361495 | A1 * | 12/2018 | Eminoglu | B23P 6/007 |
| 2021/0205910 | A1 * | 7/2021 | Cui | B23K 1/0018 |

FOREIGN PATENT DOCUMENTS

| | | | | |
|---|---|---|---|---|
| JP | 01-080704 | A | | 3/1989 |
| JP | H11170036 | A | | 6/1999 |
| JP | 2005098133 | A | * | 4/2005 |
| JP | 2007062005 | A | | 3/2007 |
| JP | 2015033718 | A | | 2/2015 |
| WO | 2014/169116 | A1 | | 10/2014 |

OTHER PUBLICATIONS

Japanese Office Action dated Aug. 27, 2025 for related JP Application No. 2024-532964, 10 pages.

Japanese Office Action dated Feb. 9, 2026 for related JP Application No. 2024-532964, 10 pages.

* cited by examiner

BRAZE REPAIR

The disclosure relates generally to braze repair processes and systems. More particularly, the disclosure relates generally to braze repair processes and systems for turbomachine components, such as but not limited to hot gas path components.

BACKGROUND

Various processes have been used for repair of hot gas path components of turbomachines. One such known process includes slurry braze or putty braze repair. Another process uses pre-sintered preforms (PSP). Slurry braze repair or use of PSP may not provide suitable densities for repair of turbomachine components. An increased density may enable higher temperature operation of the turbomachine and an extended life compared to a repair with known repair techniques.

Known methods of repair, including some utilizing braze repair or PSP, require weld or pre-forms that attempt to mitigate braze "run" off of a free edge of the repair location when the braze is liquified during a heat treatment, such as braze thermal cycle. Use of weld or pre-forms for braze repair methods may increase the complexity and/or number of repair methods steps. This increased complexity and/or steps of repair add cost, time, and may add opportunities for errors on the overall repair process.

BRIEF DESCRIPTION

All aspects, examples and features mentioned below can be combined in any technically possible way.

An aspect of the disclosure provides a method that includes positioning a constraining member relative to a component to create a zone between the component and the constraining member; positioning a first material composition in the zone between the component and the constraining member; positioning a second material composition in the zone between the component and the constraining member, the second material composition positioned on the first material composition; heat treating the component, the constraining member, the first material composition, and the second material composition, so the second material composition flows into the first material composition and forms a third material composition; and removing the constraining member and at least some of the third material composition to form a near net shape of the component.

Another aspect of the disclosure includes any of the preceding aspects, and further including removing at least some of the third material composition to form a near net shape of the component.

Another aspect of the disclosure includes any of the preceding aspects, and the constraining member includes at least one of a planar element, a flexible element, or an element shaped to a contour of the component.

Another aspect of the disclosure includes any of the preceding aspects, and the first material composition includes a high melt powder.

Another aspect of the disclosure includes any of the preceding aspects, and the first material composition includes a binder.

Another aspect of the disclosure includes any of the preceding aspects, and the second material composition includes a low melt powder.

Another aspect of the disclosure includes any of the preceding aspects, and the second material composition includes a high melt powder.

Another aspect of the disclosure includes any of the preceding aspects, and the high melt powder and the low melt powder include superalloy materials.

Another aspect of the disclosure includes any of the preceding aspects, and an amount of the low melt powder is greater than an amount of the high melt powder.

Another aspect of the disclosure includes any of the preceding aspects, and the heating treating includes heat treating in a braze thermal cycle and an induction brazing process.

Another aspect of the disclosure includes any of the preceding aspects, and positioning the constraining member relative to the component to create a zone between the component and the constraining member includes positioning the constraining member on the component by at least one of welding the constraining member to the component, resistance spot welding or tack welding the constraining member to the component, brazing the constraining member to the component, and mechanically attaching the constraining member to the component.

Another aspect of the disclosure includes any of the preceding aspects, and removing at least some of the third material composition in the zone to form a near net shape of the component includes at least one of removing by machining, physical separation, blending, and leaching the constraining member from the component and the third material composition.

Another aspect of the disclosure includes any of the preceding aspects, and the constraining member includes a material compatible with at least one of the component, the first material composition, and the second material composition.

Another aspect of the disclosure includes any of the preceding aspects, and the constraining member and the component include superalloy materials.

Another aspect of the disclosure includes any of the preceding aspects, and the component includes a turbomachine component.

Another aspect of the disclosure includes any of the preceding aspects, and the method further including blocking the at least one feature of the component with a blocking element prior to positioning the first material and positioning the second material.

Another aspect of the disclosure includes any of the preceding aspects, and further including removing the blocking element after heat treating.

Another aspect of the disclosure includes any of the preceding aspects, and the zone includes areas of damage on the component.

A further aspect of the disclosure includes a method that includes positioning a constraining member relative to a turbomachine component to create a zone between the turbomachine component and the constraining member; positioning a first material composition in the zone between the turbomachine component and the constraining member, the first material composition including a braze paste that includes a binder and high melt powder; positioning a second material composition in the zone between the turbomachine component and the constraining member, the second material composition including a low melt powder, the second material composition being positioned on the high melt powder; heat treating the turbomachine component, the constraining member, the first material composition, and the second material composition, so the second material composition flows into the first material composition and forms a third material composition in the zone; removing the constraining member from relative to the turbomachine component and relative to the third material composition; and removing at least some of the third material composition to form a near net shape of the component of the turbomachine component.

Another aspect of the disclosure includes any of the preceding aspects, and the second material composition includes amounts of high melt powder and low melt powder, an amount of the low melt powder being greater than an amount of the high melt powder.

Another aspect of the disclosure includes any of the preceding aspects, and wherein the constraining member includes a material compatible with at least one of the turbomachine component, the first material composition, and the second material composition.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
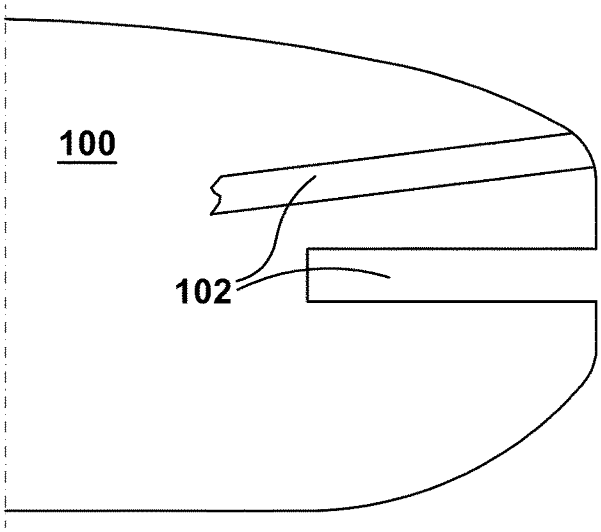
FIG. 1 illustrates a sectional schematic diagram of a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant metallurgical processes and machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent." etc.). As used herein, the term "and/or" includes any and all combinations of one or more of the associated listed items.

FIG. 1 illustrates a non-limiting sectional schematic diagram of a component 100. As embodied by the disclosure, component 100 may be a hot gas path component of a turbomachine. Examples of such hot gas path components include, but are not limited to, combustion liners, end caps, fuel nozzle assemblies, crossfire tubes, transition pieces, turbine nozzles, power nozzles, turbine stationary shrouds, and turbine blades (the latter also known as a "bucket").

As illustrated in FIG. 1, component 100 may include at least one feature 102. Feature 102 in component 100 may include but is not limited to: seal slots, cooling holes, gas path passages, and other such features that may be found in a hot gas path component 100 of turbomachines.

Figure 2:
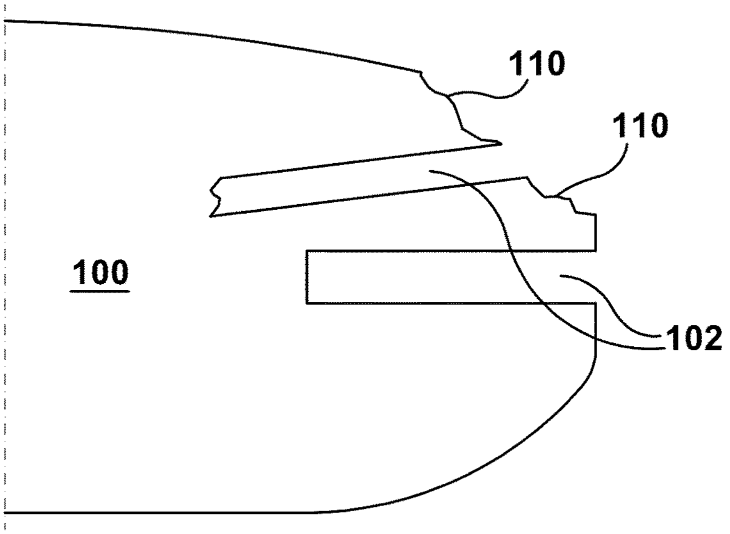
FIG. 2 illustrates a sectional schematic diagram of a component with areas of damage according to embodiments of the disclosure.

FIG. 2 illustrates component 100 including areas of damage 110 at an edge or periphery. These areas of damage 110 may include, but are not limited to oxidation, impact damages from debris, defects, manufacturing faults, and the like. The above list is merely illustrative of causes of areas of damage 110 that may occur at a component 100, such as a hot gas path component, as illustrated by the disclosure. The areas of damage 110, as embodied by the disclosure, may be a result of component 100 use, or by defects in manufacture of the component 100, or alternatively a combination of both manufacture defects and damage through use.

Figure 3:
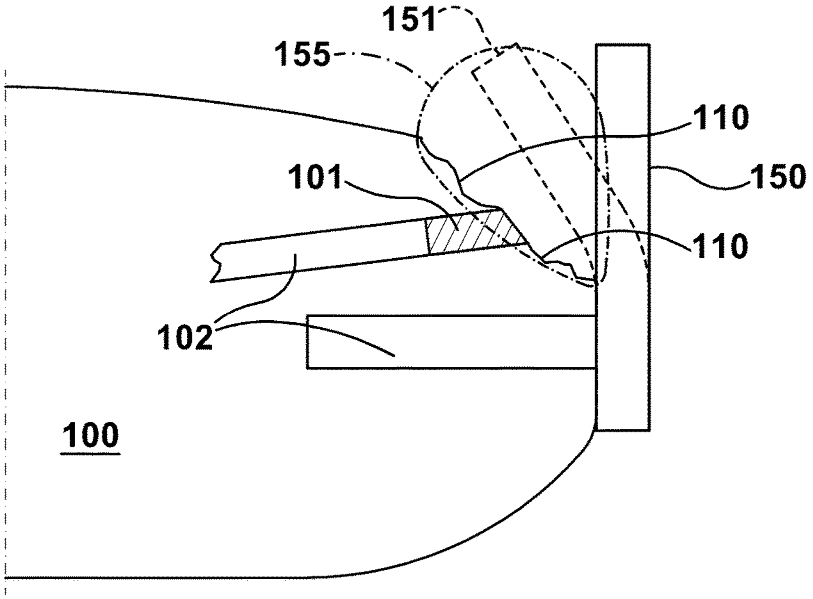
FIG. 3 illustrates a sectional schematic diagram of a component with areas of damage with a constraining member attached relative to the component, according to embodiments of the disclosure.

As embodied by the disclosure, a method to repair such areas of damage 110 is provided. With reference to the figures, including FIGS. 3-6, and flowchart FIG. 7, a first step S1 includes positioning a constraining member 150 relative to component 100, e.g., near or at an area of damage 110, to create a zone 155 between component 100 and constraining member 150. Zone 155 may include areas of damage 110 on component 100. Constraining member 150 is positioned on component 100 in close proximity of the area of damage 110. As illustrated in FIG. 3, constraining member 150 can be provided as a flat piece of stock. Alternatively, and not intended to be limiting of the disclosure in any manner, constraining member 150 may include any shaped configuration to closely approximate a shape and contour of the component 100 near the areas of damage 110 as illustrated by constraining member 151 in dotted lines.

Thus, as embodied by the disclosure, constraining member 150 can be a shim or similar structure. Constraining member 150 can include flat stock, curved stock, irregular stock, or stock customized to be configured to approximate a peripheral portion of component 100. However, aspects of the embodiments do not require constraining member 150 to possess a particular configuration, as the repair process' may include subsequent step(s) to provide a near net form repaired profile for component 110.

Constraining member 150 can be positioned relative to component 100 by any appropriate retention methods and systems. For example, the fixation of constraining member 150 to component 100 will enable repair materials, to be described hereinafter, to remain in a zone 155. For example, and in no way limiting of the embodiment, constraining member 150 may be positioned and held against component 100 by mechanical, metallurgical, brazing or welding mechanisms. The step may include, for example, resistance spot welding or tack welding, mechanically attaching constraining member 150 to component 100, using adhesive, or other retention structures (not illustrated) or any other now known or herein after developed positioning technique.

Component 100 may include one or more features 102 to be protected from the repair process. In a certain aspects of the disclosure, if component 100 includes at least one feature 102, the method may include providing a blocking element 101 (FIG. 3) to protect feature 102. In the non-limiting example, feature 102 includes a slot. Here, blocking element 101 may include a plug. The positioning of blocking element 101 in or on or over component 100, i.e., the at least one feature 102, can occur prior to positioning a first material and positioning a second material in the zone, as discussed hereinafter. Blocking element 101 can exclude materials from the repair process from flowing into, on or over the at least one feature 102. Moreover, if blocking element 101 is provided in the at least one feature 102, removal of blocking element 101 may occur after heat treating, as also described herein.

Figure 4:
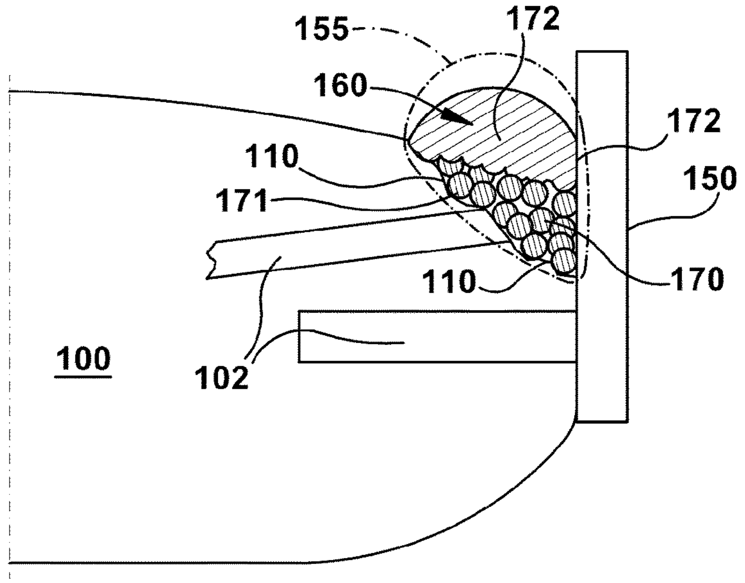
FIG. 4 illustrates a sectional schematic diagram of a component with areas of damage with a constraining member attached to the component with first material composition and second material composition positioned in a repair area, according to embodiments of the disclosure.

Step S2 of the repair process, as shown in FIG. 4, includes positioning a first material composition 170 in zone 155 between the component and the constraining member. First material composition powder 170 may include a binder is positioned in a lower region of zone 155. Portion 171 of first material composition 170 may be positioned against areas of damage 110 while another second portion 172 of first material composition 170 may be positioned against constraining member 150.

First material composition 170 can include, but is not limited to, MARM247, which has a "high" melting point temperature in a range of about 1220 °C to about 1270 °C Thus, first material composition 170 may be considered to be a high melt braze material composition including a high melt powder, as discussed herein.

Further, first material composition 170 can be provided as a braze paste or braze putty. In this braze paste or braze putty aspect of the embodiments, first material composition 170 includes a binder to form braze paste, having essentially a putty-like consistency. In this aspect, first material composition 170, as a braze paste or braze putty, can include of one or more braze alloy powders, such as but not limited to a high melt powder, and a neutral, flux-free binder.

In accordance with certain aspects, other material compositions for first material composition 170 can include other braze constituents with similar melting temperatures. For example, and not intending to limit the embodiments in any manner, first material composition 170 can include Rene 80, R142, MARM509, T800, or any other such similar high melting point braze constituent now known or hereinafter developed. In aspects of the embodiments where component is a hot gas path turbomachine component, superalloy materials are often used to form such hot gas path turbomachine component. Thus, with materials, such as but not limited to MARM247, which is a superalloy-base braze material, the braze material and component are compatible superalloy-base materials.

In a further aspect of the embodiments, first material composition 170 can include at least a percentage of high melt powder greater than the percentage of high melt powder in the second material composition 160, described herein. The first material composition 170 can include by weight, high melt powder at at least 60%, high melt powder at at least 70%, high melt powder at at least 80%, high melt powder at at least 90%, and up to about 100% high melt powder with a balance being binder. Binder content can preferably be provided in a range between about 1% and about 7% by weight. This constituent percentage can result in first material composition 170 having the form of an extrudable braze paste. In accordance with the disclosure, binders may be water or organic based, so the braze paste can dry quickly or slowly depending on their base powder and constituents. This percentage will provide the high melt powder in first material composition 170 as essentially a "putty consistency" that does not liquefy under heat treating processes before second material composition 160. This percentage will also provide the high melt braze powder in first material composition 170 at a low porosity content.

Step S3, as also shown in FIG. 4, includes positioning a second material composition 160 in zone 155 between component 100 and constraining member 150. Second material composition 160 may be positioned contacting first material composition 170. Second material composition 160 is positioned contacting a third portion 173 of first material composition 170 in step S3.

Second material composition 160 can include a braze, such as but not limited to, DF4B and D15. DF4B, for example, has a "low" melting point temperature of about 1120 °C, and D15 has a melting point of about 1160 °C. Thus, second material composition 160 may be a low melt braze material composition, including a low melt powder, wherein low melt powder of second material composition 160 melts at a lower temperature compared the high melt powder of first material composition 170. As noted herein, where component is a hot gas path turbomachine component, superalloy materials are often used to form such hot gas path turbomachine component. Thus, with materials such as but not limited to DF4B and D15, which are superalloy-base braze materials, the braze material and component are compatible superalloy-base materials.

Also, in accordance with certain aspects, other material compositions for second material composition 160 can include other braze constituents having similar melting temperatures. For example, and not intending to limit the embodiments in any manner, second material composition 160 can include AMS4728, Amdry775, B1P, 509B, or any other such similar melting point braze constituent now known or hereinafter developed.

Moreover, in certain aspects, second material composition 160 may include some of first material composition 170. An amount (weight percentage) of second material composition 160 should be higher than the amount (weight percentage) of first material composition 170. Accordingly, as embodied by the disclosure, the second material composition 160 will liquefy at a lower temperature and flow into first material composition 170 in zone 155. As second material composition 160 flows into zone 155, second material composition 160 flow will entrap any non-melted first material composition 170 and carry that non-melted first material composition 170 into zone 155 and into interstitial voids in first material composition 170 in zone 155.

A ratio of second material composition 160 to first material composition 170 can be in a range of 20 to 40% first material composition 170, to 60 to 80% second material composition 160. A further mixture ratio of second material composition 160 to first material composition 170 aspect would include 25 to 35% first material composition 170 to 65 to 75% second material composition 160. A further aspect of the embodiment of the disclosure includes 30% first material composition 170 to 70% second material composition 160.

Figure 5:
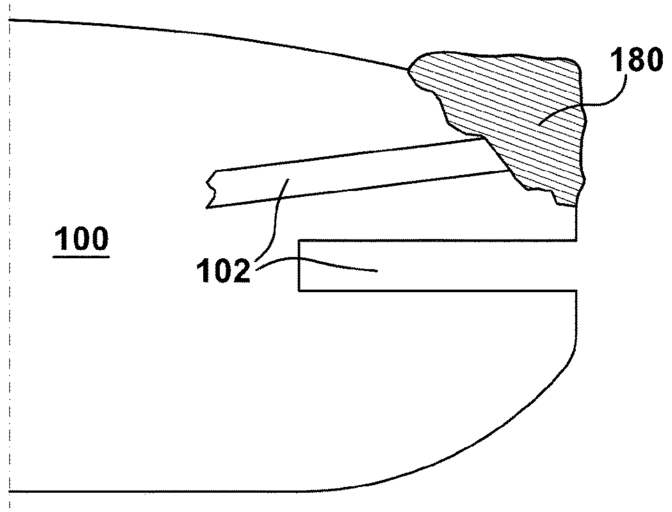
FIG. 5 illustrates a sectional schematic diagram of a component with a third material composition positioned in the repair area and with the constraining member removed.

After the second material composition 160 and first material composition 170 are positioned in area 155, step S4 includes heat treating component 100, constraining member 150, first material composition 160, and second material composition 170. As this occurs, second material composition 170 flows into first material composition 160 and forms a third material composition 180, as illustrated in FIG. 5. More particularly, a brazing process, such as at least one of a braze thermal cycle and an induction brazing process, may be performed on component 100 and second material composition 160 and first material composition 170, collectively "repair material." and constraining member 150. A braze thermal cycle includes a heat treatment with brazing as a metal-joining process in which two or more metal items are joined together by melting and flowing into the joint, with one metal (here the second material composition 160) having a lower melting point than the adjoining metal (here the first material composition 170). During the braze heat treatment, second material composition 160 liquefies and can flow. Second material composition 160 flows between first material composition 170 including its binder into interstitial voids. Second material composition 160 and first material composition 170 then may form a "third material composition 180" which when the process is complete is a repaired braze composition. As embodied by the disclosure, third material composition 180 includes second material composition 160 flowed into interstitial voids and surrounding some first material composition 170 in zone 155. The combination of second material composition 160 and first material composition 170 define third material composition 180.

After the braze heat treatment has been completed, component 100 and repaired area 155 with third material composition 180 of second material composition 160 and first material composition 170 may be cooled. During or after cooling, step S5 includes removing constraining member 150 from component 100 and removing constraining member 150 from some third material composition 180 formed on component 100. More particularly, constraining member 150 may be removed at step S5 from its position once third material composition 180 has at least partially solidified to maintain a near net form shape on component 100, as illustrated in FIG. 5. Additionally, constraining member 150 may be removed at step S5 from its position once third material composition 180 has totally solidified on component 100. The constraining member 150 can be removed once third material composition 180 is no longer liquidus or flowable so as to maintain its configuration in area 155.

As embodied by the disclosure, constraining member 150 may be removed by any appropriate process. Removal of constraining member 150 from component 100 may include removal by mechanical means. These mechanical means can include removing by machining, physical separation, blending, leaching to remove any adhesive or physical connection of constraining member 150 to component 100 or to third material composition 180, or removal by other means, now known or hereinafter developed. Removal by any means is possible where the means enables maintaining configuration of third material composition 180 in zone 155 and does not impact a connection of third material composition 180 to component 100 at damage area 110.

Figure 6:
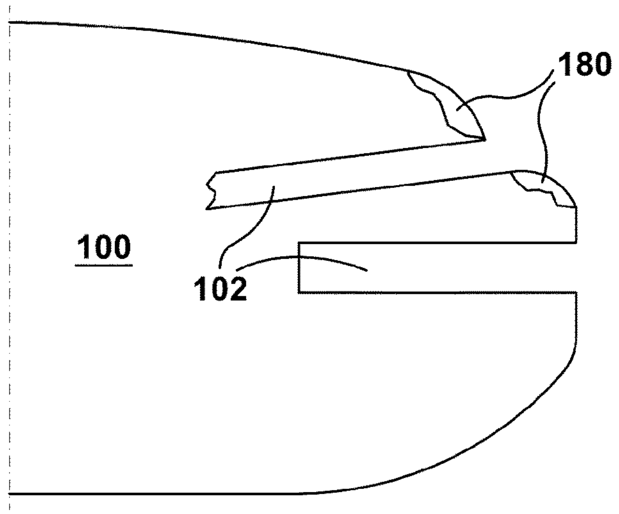
FIG. 6 illustrates a sectional schematic diagram of a component with some third material composition optionally removed to provide a near net shape of the component, according to embodiments of the disclosure.
Figure 7:
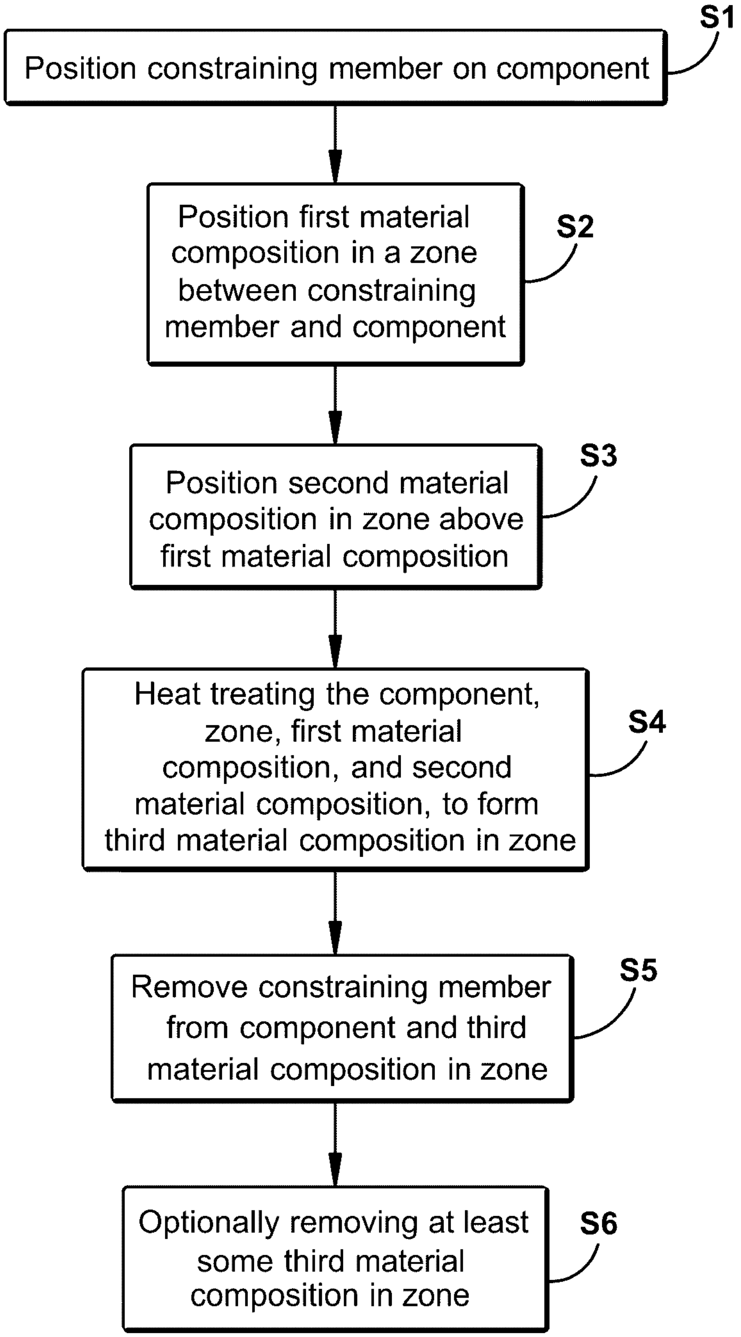
FIG. 7 is a flow chart of a process to repair a component, according to embodiments of the disclosure.

Once constraining member 150 has been removed, as shown in FIG. 6, optional step S6 may include removing at least some of third material composition 180 to form a near net shape of the component 100. The removal of at least some of third material composition 180 may be to, for example, conform third material composition 180 to a periphery of component 100. The removal of third material composition 180, as embodied by the disclosure, can provide a near net shape, metallurgically acceptable repair geometry, and highly dense repair geometry for component 100, as repaired.

Additionally, and in a further aspect of the embodiments, if component 100 included feature 102, machining or rework can be done on third material composition 180 and component 100. The machining or rework on repaired component 100 can reform or reopen any of such feature 102 configurations, as noted above.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about." "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A method comprising:

positioning a constraining member relative to a component to create a zone between the component and the constraining member, wherein the zone includes at least one area of damage on the component;

positioning a first quantity of a first material composition in the zone between the component and the constraining member against and outside of the at least one area of damage;

positioning a second quantity of a second material composition in the zone between the component and the constraining member after positioning the first quantity of the first material composition, wherein the second quantity of the second material composition is positioned contacting the first quantity of the first material composition, wherein the first material composition is not heated from the time the first quantity of the first material composition is positioned until after the positioning of the second quantity of the second material composition contacting the first quantity of the first material composition;

heat treating the component, the constraining member, the first material composition, and the second material composition, wherein the second material composition flows into the first material composition and forms a third material composition, whereby the third material composition flows into the at least one area of damage; and removing the constraining member and at least some of the third material composition from component.

2. The method according to claim 1, further including the removing at least some of the third material composition from component forming a near net shape of the component.

3. The method according to claim 1, wherein the constraining member includes at least one of a planar element, a flexible element, or an element shaped to a contour of the component.

4. The method according to claim 1, wherein the first material composition includes a high melt powder that has a melting temperature of from about 1220 °C to about 1270 °C.

5. The method according to claim 1, wherein the first material composition includes a binder.

6. The method according to claim 1, wherein the second material composition includes a low melt powder that has a melting temperature of from about 1120 °C to about 1160 °C.

7. The method according to claim 1, wherein the second material composition includes a high melt powder that has a melting temperature of from about 1220 °C to about 1270 °C.

8. The method according to claim 4, wherein the second material composition includes a low melt powder that has a melting temperature of from about 1120 °C to about 1160 °C, and wherein the high melt powder and the low melt powder include superalloy materials.

9. The method according to claim 4, wherein the second material composition includes a low melt powder that has a melting temperature of from about 1120 °C to about 1160 °C, and wherein an amount of the low melt powder is greater than an amount of the high melt powder.

10. The method according to claim 1, wherein heating treating includes heat treating in a braze thermal cycle.

11. The method according to claim 1, wherein positioning the constraining member relative to the component to create the zone between the component and the constraining member includes positioning the constraining member on the component by at least one of welding the constraining member to the component, tack welding the constraining member to the component, resistance spot welding the constraining member to the component, or brazing the constraining member to the component, and mechanically attaching the constraining member to the component.

12. The method according to claim 1, wherein removing at least some of the third material composition in the zone to form a near net shape of the component includes at least one of removing by machining, physical separation, blending, and leaching the constraining member from the component and the third material composition.

13. The method according to claim 1, wherein the constraining member includes a material compatible with at least one of the component, the first material composition, and the second material composition.

14. The method according to claim 1, wherein the constraining member and the component include superalloy materials.

15. The method according to claim 1, wherein the component includes a turbomachine component.

16. The method according to claim 15, further including blocking at least one feature of the component with a blocking element prior to positioning the first material and positioning the second material.

17. The method according to claim 1, further including positioning a blocking element in the component and removing the blocking element after heat treating.

18. A method comprising:

positioning a constraining member relative to a turbomachine component to create a zone between the turbomachine component and the constraining member;

positioning a first quantity of a first material composition in the zone between the turbomachine component and the constraining member against and outside of at least one area of damage of the turbomachine component, the first quantity of the first material composition including a braze paste that includes a binder and high melt powder that has a melting temperature of from about 1220 °C to about 1270 °C;

positioning a second quantity of a second material composition in the zone between the turbomachine component and the constraining member after positioning the first quantity of the first material composition, wherein the first quantity of the first material is between the turbomachine component and the second quantity of the second material, the second material composition including a low melt powder that has a melting temperature of from about 1120 °C to about 1160 °C, the second quantity of the second material composition being positioned on the high melt powder, wherein the first material composition is not heated from the time the first material composition is positioned until after the positioning of the second quantity of the second material composition contacting the first quantity of the first material composition;

heat treating the turbomachine component, the constraining member, the first material composition, and the second material composition, so the second material composition flows into the first material composition and forms a third material composition in the zone, whereby the third material composition flows into the at least one area of damage of the turbomachine component;

removing the constraining member from relative to the turbomachine component and relative to the third material composition; and removing at least some of the third material composition to form a near net shape of the component of the turbomachine component.

19. The method according to claim 18, wherein the second material composition includes amounts of high melt powder and low melt powder, an amount of the low melt powder being greater than an amount of the high melt powder.

* * * * *